United States Patent Office 3,489,431
Patented Jan. 13, 1970

3,489,431
CONNECTION FACILITATING HITCH
Charles E. McKeon, Birmingham, and Merwin D. Beckwith, Clawson, Mich., assignors to Ford Motor Company, Dearborn, Mich., a corporation of Delaware
Filed Dec. 22, 1967, Ser. No. 692,988
Int. Cl. B60d 1/04, 1/00
U.S. Cl. 280—478                                  4 Claims

ABSTRACT OF THE DISCLOSURE

A tractor hitch in which the lower links are adjusted to the proper spacing for engagement with an implement and rocked laterally by means of a U-shaped tractor-mounted frame which does not interfere with normal movement of an implement coupled to the tractor links. The frame comprises two upright members pivoted to the tractor rear axle and connected for simultaneous movement, the frame being manipulated by the operator without dismounting from the tractor seat. For adjustability of spacing between the links the upright members may be connected by a turn-buckle.

---

This invention relates to tractor hitches, and more particularly to hitches which are operable from the tractor seat to hitch or unhitch an implement attached to the rear of the tractor.

Agricultural and general purpose tractors conventionally are provided with a tractor hitch which may comprise a pair of laterally spaced lower links mounted on the rear axle housing for limited universal movement. In so-called "quick hitches" that can be coupled to or uncoupled from an implement by the operator while in the tractor seat, provision is made for operating latches on the rear ends of the links by remote control from the tractor seat.

According to the present invention, a linkage and springs are provided for adjusting the space between the rear ends of the links as required by the implement being hitched. The linkage is pivotally mounted on the rear of the tractor and may be manipulated from the tractor seat to move the links laterally as required for hitching while maintaining unchanged the spaces between the links. The linkage does not restrict normal movement or raising of an implement mounted on the links.

Among the objects of the present invention are to provide a tractor hitch of the quick hitch type in which hitching to an implement is facilitated; to provide such a hitch in which the links are maintained laterally spaced as required for coupling to an implement, the spacing being adjustable from the tractor seat; to provide such a hitch in which normal movement and raising of an implement mounted on the links is not restricted; and generally to improve tractor hitches of the type described.

Other objects, and objects relating to details and economies of construction will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming a part of this specification in which:

Figure 1:
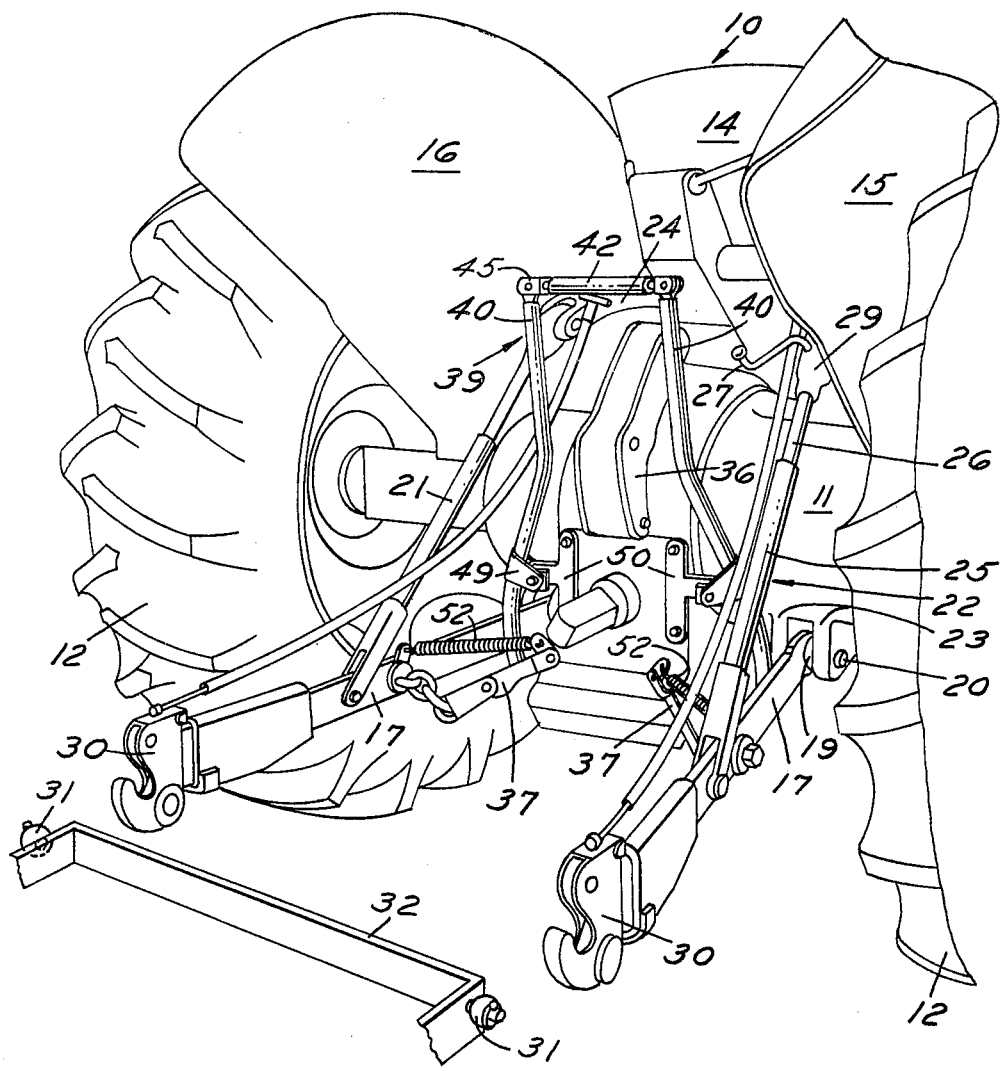
FIGURE 1 is an isometric view of the rear of a tractor having a hitch according to the present invention, portions of the tractor being shown in broken lines.

Referring now to the drawings, the tractor 10 of the present invention includes a rear axle housing 11 and a pair of rear drive wheels 12. The tractor is provided with an operator's seat 14 positioned between the fenders 15 and 16 of the tractor.

The tractor has a pair of rearwardly extending laterally swingable draft links 17 having their forward ends mounted for limited universal movement on the axle housing 11. The mounting may consist of a ball 19 received within a socket (not shown) in the forward end of the link and a pin 20 extending diametrically through the ball and through ear portions 23 of the axle housing to attach each link thereto.

The draft links 17 are supported by a set of lift links 21 and 22 which pivotally attach to an intermediate portion of the draft links. The upper ends of the lift links 21 and 22 are pivotally connected to a pair of lift arms operated by the tractor hydraulic lift system, one lift arm 24 being shown. Preferably, the lift link 22 consists of upper and lower telescoping sections 25 and 26 which are threadedly connected. The upper end 26 may be rotated by operation of a leveling crank 27 extending from a leveling gear box 29 for raising or lowering the associated draft links to level an implement, e.g. a plow, attached to the rear ends of the draft links.

The rear ends of the draft links 17 are provided with sockets 30 of the "quick hitch" type which may be engaged and latched about balls 31 supported on the frame 32 of an implement to be attached to the tractor. The sockets 30 may be of the spring-latch type for engagement about the balls 31 of the implement frame without the necessity of the tractor operator dismounting from the tractor seat in order to hitch the implement. Lanyards 34 are provided for releasing the sockets 30 when it is desired to release an implement, the lanyards leading upwardly so as to be operable by the tractor operator when seated in the seat 14. Du Shane U.S. Patent 2,775,180 of Dec. 25, 1956 shows tractor lower links equipped with link ends of this type.

The draft links 17 are capable of limited universal movement about their mountings on the rear axle housing 11. Check chains 37 are provided to limit the outward lateral swinging move of each lower draft link 17 in order to prevent the link or attached implement from hitting the tractor wheels 12. When hitched to an implement, the draft links 17 extend rearwardly in slightly diverging relation, the rear ends of the links when engaged with an implement being held apart by the implement frame 32 supporting the balls 31. The space between the balls 31 is the subject of industry standards, smaller implements and tractors having one spacing known as Catagory 1 and larger tractors and implements having a greater spacing, known as Catagory 2.

In hitching the tractor 10 to an implement, the tractor is backed into the implement and the links raised somewhat to engage the sockets 30 about the balls 31 of the implement frame. In order to facilitate hitching, according to the present invention an adjustable frame 39 is mounted on the tractor rear axle housing 11 to maintain the sockets 30 spaced at a fixed interval corresponding to the spacing between the implement balls 31. The frame 39 also serves to sway the links 17 laterally in order to align the sockets 30 with the balls 31 of the implement, as will be explained.

The frame 39 is of a generally inverted, U-shaped configuration and consists of a pair of side members 40 which are interconnected adjacent their upper ends by a link 42 pivotally connected to the upper end of each side member. The link 42, which is easily accessible to the tractor operator from the tractor seat, is of the turnbuckle type, consisting of a pair of end members 44 and 45, one having a right hand thread and one having a left hand thread, and a telescoping sleeve 46 threadly engaged with the members 44 and 45. Rotation of the sleeve 46 in one direction shortens the link 42, while rotion of the sleeve in the opposite direction lengthens the link.

Preferably the ends of the link 42 are pivotally connected to the upper ends of the frame side members 40 by extensions 47 received within the upper ends of the side members, which may be formed of steel tubing. An intermediate portion of each side member may be provided with an inwardly extending ear or tab 49 which is pivotally supported from the rear axle housing 11 by a mounting bracket 50 secured to the housing.

Each side member has a lower, outwardly bowed or associate portion 51 for engaging the inside face of the adjacent draft link 17. The upper portions of the frame side members are somewhat converged as indicated in the drawings.

A pair of springs 52 bias the links 17 inwardly against the lower, bowed portions 51 of the frame side members 40. The springs 52 are only sufficiently strong to maintain the links against the frame 39 when the links are not coupled to an implement and will not to any perceptible degree restrict the free movement of the links and attached implement.

Figure 2:
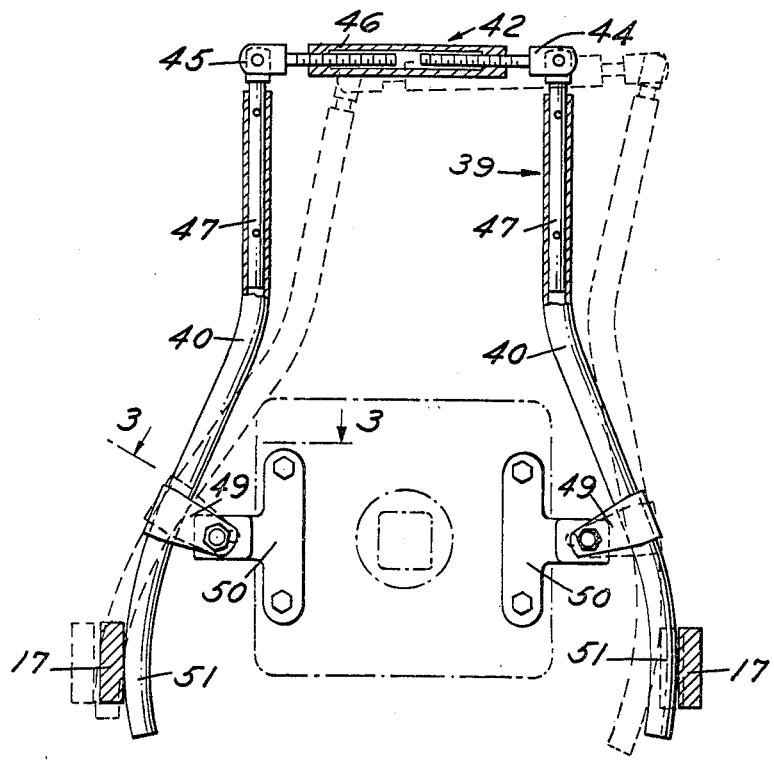
FIGURE 2 is a rear elevation of the frame for positioning the tractor links, portions of the tractor links and tractor rear axle housing being shown.
Figure 3:
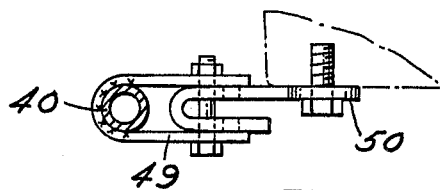
FIGURE 3 is a cross-section of the link-positioning frame, taken generally on the line 3—3 of FIGURE 2.

In using the connection facilitating hitch of the present invention, the tractor operator may back the tractor until the sockets 30 are in proximity to the hitch balls 31 of the implement and then may finally adjust the spacing between the sockets by turning the turn-buckle sleeve 46. Extension of the links 42 serves to reduce spacing between the link ends while shortening of the link increases such spacing. The springs 52 hold the links against the lower bowed portions 51 of the frame side members. After adjusting the spacing, if necessary, the operator without dismounting from the tractor seat may rock the frame 39 to one side or the other as indicated in FIGURE 2 by manually displacing the link 42 of the frame in either direction so as to rock the side members 40 in a substantially vertical transverse plane and align the sockets 30 with the implement mounting hitch balls 31. While holding such alignment, the operator may reverse the tractor to cause the sockets 30 to engage about the balls and complete the hitch.

The converging upper end portion of the frame 39 provides the necessary clearance for the lift links 21 and 22 when the link 17 and attached implement are in raised portion so as to permit normal, unrestricted movement of the implement. This clearance also permits operation of the leveling crank 27. The pivotal mounting of the frame side members 40 on the axle housing is substantially above the mounting of the forward ends of the draft links 17 on the axle housing so that when the draft links are generally level, they are free to sway from side to side, the articulate frame 39 permitting such movement as indicated in FIGURE 2. The portions of the frame side members adjacent the pivotal mounting of the members on the tractor are somewhat converged so that lateral swaying of the links is not restricted even when the links are opposite the pivots.

Inasmuch as the frame 39 is mounted on the rear axle rather than being supported on the draft links 17, it does not rise with the links and does not present a problem of interference with the seat or operator even when the links are fully raised. At the same time, the upper end of the frame 39 is readily accessible to the operator from the tractor seat for manipulating the links during hitching.

What is claimed is:

1. In a tractor having a rear axle housing and a pair of rearwardly extending, laterally spaced draft links mounted for limited universal movement on the rear axle housing; a vertically extending, articulated frame comprising a pair of spaced side members each pivotally supported from the rear axle housing for rocking movement in a plane generally perpendicular to the draft links and a third member interconnecting the side members for simultaneous movement, the side members extending downwardly between and below the level of the links the lower portion of each side member limiting inward swinging movement of the adjacent link, and means biasing each of the links against the adjacent side member.

2. In a tractor as claimed in claim 1, the third member comprising a turn-buckle pivotally connected to the upper end portion of each side member, adjustment of the turn-buckle adjusting the spacing between the lower portions of the side members.

3. In a tractor as claimed in claim 2, the pivotal support of the side members being located a short distance above the elevation of mounting of the draft links on the rear axle housing.

4. In a tractor as claimed in claim 1, the means for biasing each link against the adjacent side member comprising a tension spring extending between an intermediate portion of the links and the control portion of the rear axle housing.

References Cited

UNITED STATES PATENTS

| 2,914,342 | 11/1959 | Silver et al. | 172—272 X |
| 3,310,123 | 3/1967 | Abbott | 172—450 |
| 3,312,478 | 4/1967 | Knaapi | 172—272 X |
| 3,432,184 | 3/1969 | Tweedy | 280—479 |
| 3,434,737 | 3/1969 | Bailey et al. | 280—461 |

LEO FRIAGLIA, Primary Examiner

U.S. Cl. X.R.

172—272, 439, 450